United States Patent
Balasubramanian et al.

(10) Patent No.: US 10,616,168 B2
(45) Date of Patent: Apr. 7, 2020

(54) DYNAMICALLY CHANGING MESSAGE CLASSIFICATION AND PRIORITY BASED ON IOT DEVICE PUBLICATION

(71) Applicant: INTERNATIONAL BUSINESS MACHINES CORPORATION, Armonk, NY (US)

(72) Inventors: Swaminathan Balasubramanian, Troy, MI (US); Ravi P. Bansal, Tampa, FL (US); Santosh Borse, Westchester, NY (US); Radha Radha Mohan De, Howrah, IN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 33 days.

(21) Appl. No.: 15/805,626

(22) Filed: Nov. 7, 2017

(65) Prior Publication Data
US 2019/0141001 A1    May 9, 2019

(51) Int. Cl.
*H04L 12/58*    (2006.01)
*H04L 29/08*    (2006.01)
(Continued)

(52) U.S. Cl.
CPC .......... *H04L 51/26* (2013.01); *G06F 17/2785* (2013.01); *H04L 41/5006* (2013.01);
(Continued)

(58) Field of Classification Search
CPC .. H04L 51/26; H04L 67/2809; G06F 17/2785
(Continued)

(56) References Cited

U.S. PATENT DOCUMENTS 2,017,001 A * 10/1935 Hocking ................. B60G 5/04
                                                280/680
7,065,563 B2 * 6/2006 Islam .................... H04L 41/082
                                                709/220
(Continued)

FOREIGN PATENT DOCUMENTS

WO    2017127743    7/2017

OTHER PUBLICATIONS

List of IBM Patents or Patent Applications Treated as Related 1 page.

(Continued)

*Primary Examiner* — David R Lazaro
*Assistant Examiner* — Berhanu Shitayewoldetadik
(74) *Attorney, Agent, or Firm* — Nicholas Bowman; Andrew D. Wright; Roberts Mlotkowski Safran Cole & Calderon P.C.

(57) ABSTRACT

Approaches for automatically and dynamically changing message classification and priority based on Internet-Of-Things (IOT) device publication are provided. A system includes: a CPU, a computer readable memory, and a computer readable storage medium; program instructions to receive a device status message from an Internet-of-Things (IOT) device; program instructions to determine a categorization of the device status message; program instructions to determine a classification of an email message; program instructions to compare the categorization of the device status message to the classification of the email message; and program instructions to assign a priority to the email message based on the comparing. The program instructions are stored on the computer readable storage medium for execution by the CPU via the computer readable memory.

20 Claims, 5 Drawing Sheets

(51) Int. Cl.
*G06F 17/27* (2006.01)
*H04L 12/24* (2006.01)

(52) U.S. Cl.
CPC .......... *H04L 67/12* (2013.01); *H04L 67/2809* (2013.01); *H04L 51/02* (2013.01); *H04L 67/02* (2013.01)

(58) Field of Classification Search
USPC .......................................................... 709/206
See application file for complete search history.

(56) References Cited

U.S. PATENT DOCUMENTS

| | | | | |
|---|---|---|---|---|
| 9,911,290 | B1* | 3/2018 | Zalewski | G07G 1/0072 |
| 10,140,820 | B1* | 11/2018 | Zalewski | G07G 1/0072 |
| 2002/0055864 | A1* | 5/2002 | Cardwell | G06Q 10/10 |
| | | | | 707/758 |
| 2002/0087649 | A1* | 7/2002 | Horvitz | G06Q 10/107 |
| | | | | 709/207 |
| 2002/0116083 | A1* | 8/2002 | Schulze | H01L 22/20 |
| | | | | 700/108 |
| 2002/0138581 | A1* | 9/2002 | MacIntosh | G06Q 10/107 |
| | | | | 709/206 |
| 2003/0046421 | A1* | 3/2003 | Horvitz | G06Q 10/107 |
| | | | | 709/238 |
| 2003/0220937 | A1* | 11/2003 | Maeoka | G06Q 10/109 |
| 2005/0200889 | A1* | 9/2005 | Oomura | G03G 15/5079 |
| | | | | 358/1.15 |
| 2006/0010217 | A1* | 1/2006 | Sood | H04L 51/12 |
| | | | | 709/206 |
| 2012/0191585 | A1* | 7/2012 | Lefebvre | G06Q 10/10 |
| | | | | 705/35 |
| 2012/0254322 | A1* | 10/2012 | Majeti | G06Q 10/107 |
| | | | | 709/206 |
| 2012/0272252 | A1* | 10/2012 | Beardsmore | G06F 9/542 |
| | | | | 719/328 |
| 2013/0055288 | A1* | 2/2013 | Jonnagadla | G06F 9/505 |
| | | | | 719/317 |
| 2014/0082114 | A1 | 3/2014 | Vadassery et al. | |
| 2015/0039703 | A1* | 2/2015 | Kursun | H04L 51/34 |
| | | | | 709/206 |
| 2015/0039704 | A1* | 2/2015 | Kursun | H04L 51/22 |
| | | | | 709/206 |
| 2015/0347486 | A1* | 12/2015 | Julia | G06N 3/08 |
| | | | | 707/736 |
| 2015/0381776 | A1* | 12/2015 | Seed | H04L 5/0055 |
| | | | | 709/203 |
| 2016/0048114 | A1* | 2/2016 | Matthieu | G05B 15/02 |
| | | | | 700/83 |
| 2016/0087933 | A1* | 3/2016 | Johnson | H04W 4/70 |
| | | | | 709/245 |
| 2017/0006034 | A1* | 1/2017 | Link, II | H04L 61/2592 |
| 2017/0006135 | A1* | 1/2017 | Siebel | H04L 67/02 |
| 2017/0011298 | A1* | 1/2017 | Pal | G06N 5/04 |
| 2017/0232300 | A1 | 8/2017 | Tran et al. | |
| 2017/0331887 | A1* | 11/2017 | Fishler | H04L 67/1087 |
| 2018/0103039 | A1* | 4/2018 | Thaler | H04L 67/12 |
| 2018/0183874 | A1* | 6/2018 | Cook | H04L 67/12 |
| 2018/0285062 | A1* | 10/2018 | Ulaganathan | H04L 67/12 |
| 2018/0285234 | A1* | 10/2018 | Degaonkar | H04L 43/0817 |
| 2018/0351793 | A1* | 12/2018 | Hunter | H04L 41/082 |
| 2019/0081857 | A1* | 3/2019 | Demetriou | H04L 41/0816 |

OTHER PUBLICATIONS

Specification "Dynamically Changing Message Classification and Priority Based on IOT Device Publication" and Drawings in U.S. Appl. No. 15/841,975, filed Dec. 14, 2017, 38 pages.
Mell et al., "The NIST Definition of Cloud Computing", NIST, Special Publication 800-145, Sep. 2011, 7 pages.
Office Action dated Jul. 23, 2019 in related U.S. Appl. No. 15/841,975, 12 pages.
Notice of Allowance dated Jan. 14, 2020 in U.S. Appl. No. 15/841,975, 13 pages.

\* cited by examiner

DYNAMICALLY CHANGING MESSAGE CLASSIFICATION AND PRIORITY BASED ON IOT DEVICE PUBLICATION

BACKGROUND

The present invention generally relates to message handling and, more particularly, to automatically and dynamically changing message classification and priority based on Internet-Of-Things (IOT) device publication.

Conventional messaging systems, such as email, allow a message sender to indicate whether or not the message is a priority message, and notify the message recipient of the existence of any priority messages when the recipient accesses his or her message inbox. Current state of the art messaging systems may provide for additional ways to set the priority or classification of a received message based on factors such as: who the message sender is (a family member versus a stranger); the type or class of the message sender (a supervisor versus a peer); whether the sender is a member of the receiver's social or professional network; the date/time when the message is/was sent; and the content of the message itself (spam versus ham).

SUMMARY

In a first aspect of the invention, there is a computer-implemented method comprising: receiving, by a computer device, a device status message from an Internet-of-Things (IOT) device; receiving, by the computer device, a message from a message server; assigning, by the computer device, a priority to the message based on the device status message from the IOT device; and communicating, by the computer device, the assigned priority of the message to the message server.

In another aspect of the invention, there is a computer program product for dynamically prioritizing messages. The computer program product comprises a computer readable storage medium having program instructions embodied therewith, the program instructions executable by a computer device to cause the computer device to: receive user credentials associated with an Internet-of-Things (IOT) device; subscribe to an IOT broker using the user credentials; receive a device status message from the IOT broker based on the subscribing, wherein the device status message includes health data of the IOT device; determine a categorization of the device status message; receive an email message from a message server; determine a classification of the email message; compare the categorization of the device status message to the classification of the email message; assign a priority to the email message based on the comparing; and transmit the assigned priority to the message server.

In another aspect of the invention, there is system comprising: a CPU, a computer readable memory, and a computer readable storage medium; program instructions to receive a device status message from an Internet-of-Things (IOT) device; program instructions to determine a categorization of the device status message; program instructions to determine a classification of an email message; program instructions to compare the categorization of the device status message to the classification of the email message; and program instructions to assign a priority to the email message based on the comparing. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to message handling and, more particularly, to automatically and dynamically changing message classification and priority based on Internet-Of-Things (IOT) device publication. Aspects of the present invention are directed to dynamically setting message priority in a user's inbox based on the status of IOT devices that a user is employing. Embodiments include a system by which a user's messaging system is given authority to subscribe to health status publications of one or more IOT devices, the health status of the IOT devices being published by the IOT devices to respective brokers. According to aspects of the invention, a module within the messaging system uses the device health status data and applies it to an incoming message to assign a new priority to the message or to reclassify the message (e.g., from "spam" to "ham").

Conventional techniques set a priority of a message once in a static manner, but do not address the situation where some messages should be assigned a new priority because those messages pertain to certain events that neither the sender nor the receiver are aware of themselves. There could be events that take place unbeknownst to the sender, the receiver, the messaging system or the message itself that could have an impact on the message priority. For example, if a user has previously classified messages relating to a "car tire advertisement" as low priority spam, there could be a situation where it would be preferable not to classify such messages in such a manner anymore. Conventional techniques do not allow for such flexibility. Aspects of the invention, however, provide a mechanism for automatically changing the priority of a message based on data from IOT devices. In the example provided, a user's automobile may be equipped with an IOT sensor that publishes a message indicating that a tire of the automobile is near failure and, based on this data, the message system may automatically change the priority of an incoming "car tire advertisement" email from low priority to high priority. In this manner, systems and method according to aspects of the invention may dynamically re-prioritize or re-classify a message (e.g., an email) based on additional information gathered from IOT devices, the information being unknown to the sender and the receiver of the message (e.g., the email).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
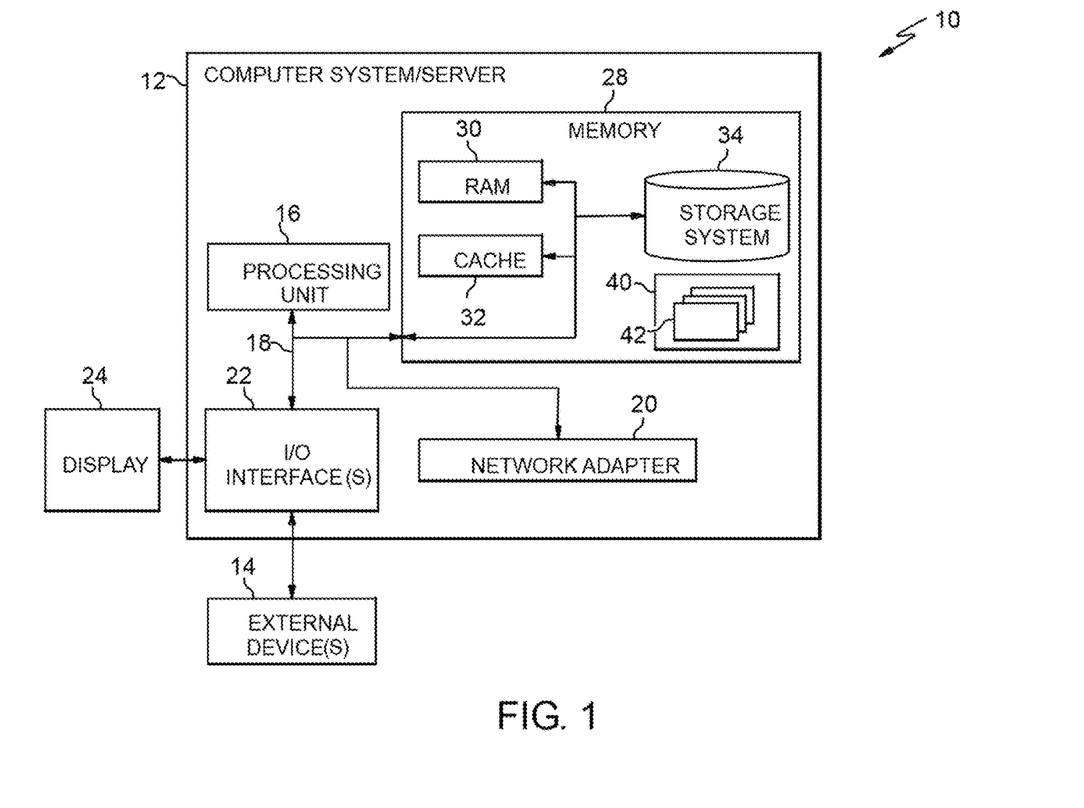
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
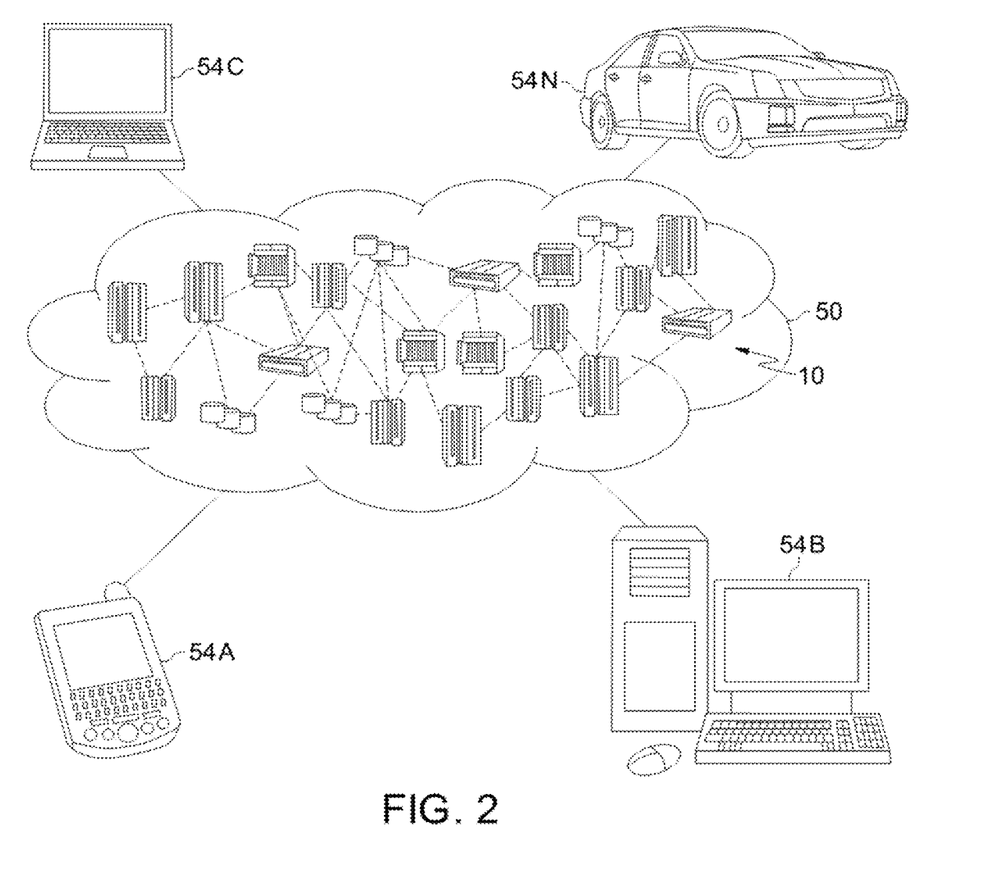
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
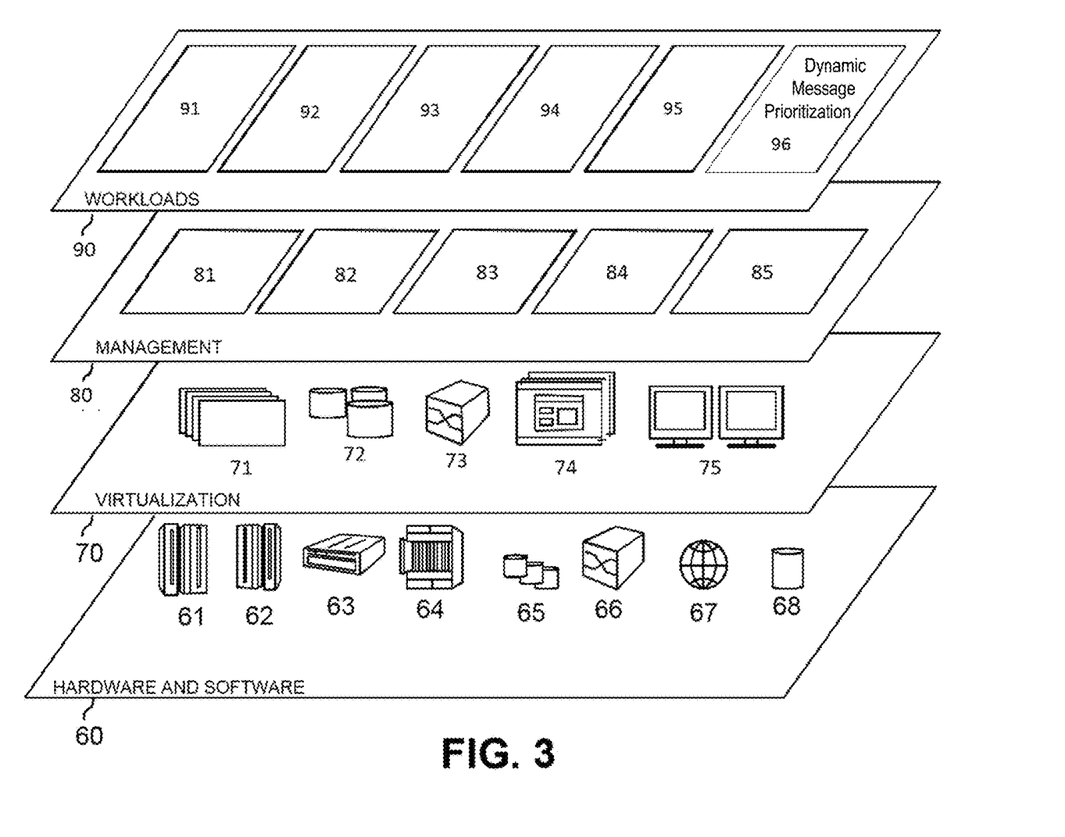
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic message prioritization 96.

Figure 4:
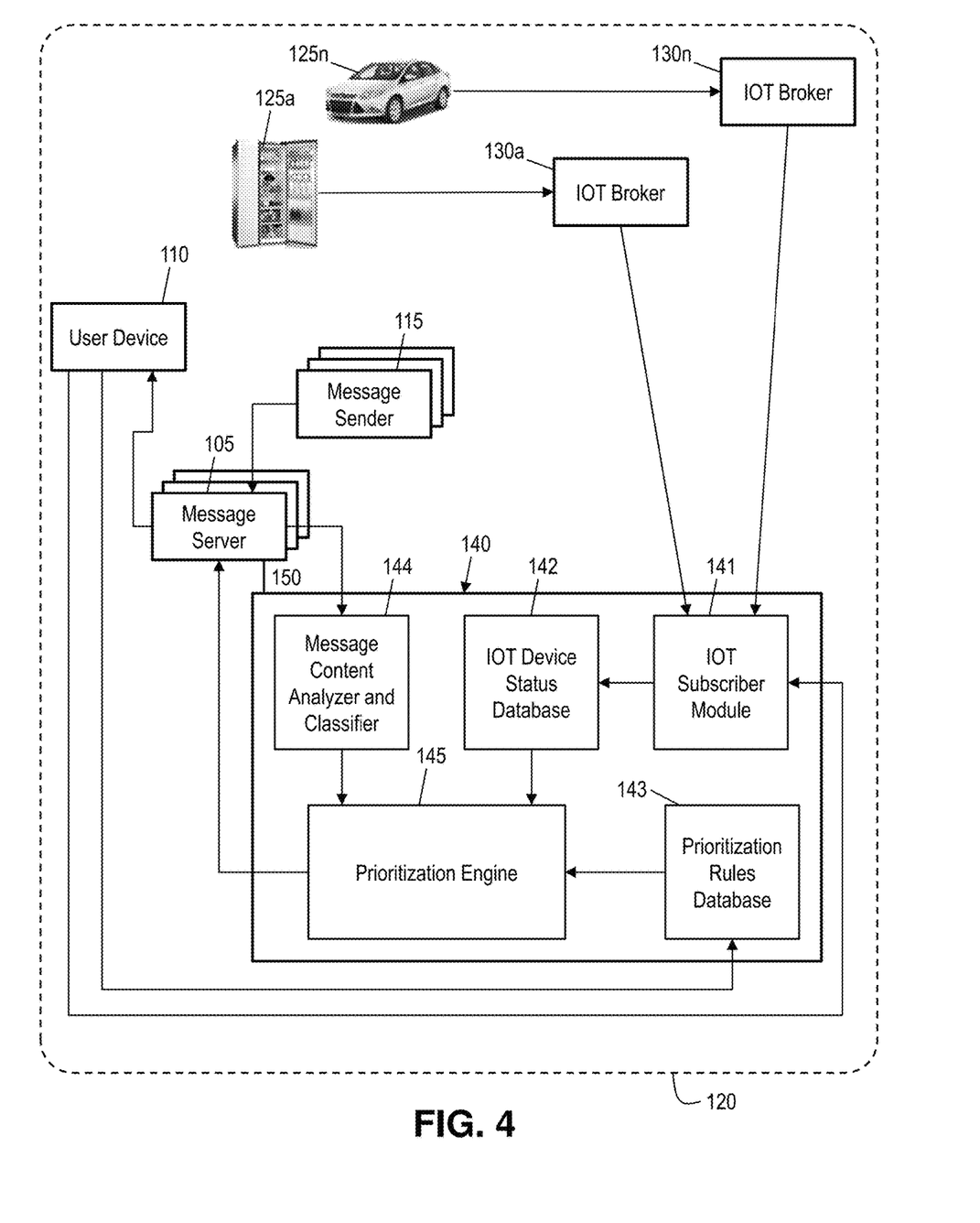
FIG. 4 shows a block diagram of an exemplary environment in accordance with aspects of the invention.

FIG. 4 shows a block diagram of an exemplary environment in accordance with aspects of the invention. In embodiments, the environment includes a message server 105 and a user device 110. The user device 110 may be any computer device that is capable of receiving messages from the message server 105. For example, the user device 110 may be a desktop computer, a laptop computer, a tablet computer, a smartphone, or a wearable computer such as a smart watch, smart glasses, etc. The user device 110 may store and run a messaging application program that is configured to cause the user device 110 to display an interface that displays messages received from the message server 105. For example, the messaging application program may cause the user device 110 to display an email interface that displays emails in folders such as an inbox folder and a spam/trash/junk folder. The messages, and the messaging application, may be of any desired type including but not limited to email messages, instant messages, text messages, or any other message received on any messaging service. Aspects of the invention are described with respect to a single message server 105. However, the user device 110 may store and run plural different messaging application programs associated with plural different message servers 105, respectively, and aspects described herein may be used in dynamically adjusting the priority of a message associated with any one of the plural different message servers 105.

The message server 105 may be a computer device that is configured to receive messages from one or more message senders (such as message sender 115) and transmit the messages to respective user devices (such as user device 110). The message sender 115 may be a user computer device, similar to user device 110, or may be a server, such as a website server or other third party server. The message server 105 may communicate with each of the user device 110 and the message sender 115 via a network 120, such as the Internet. The description of the message server 105, user device 110, and message sender 115 thus far is that of a conventional messaging system such as an Internet-based email messaging system.

Still referring to FIG. 4, the environment includes one or more IOT devices 125a-n that communicate with respective IOT brokers 130a-n. In embodiments, an IOT device is an IOT-enabled device that includes electronics, software, at least one sensor, and network connectivity, and that is configured to collect and exchange data. IOT devices may include but are not limited to home appliances (e.g., refrigerator, toaster, television, etc.), office machines (e.g., copy machine, fax machine, etc.), thermostats, security systems, and vehicles. In the exemplary environment shown in FIG. 4, IOT device 125a is a refrigerator that has a sensor that detects the health of a water filter that is installed in the refrigerator, and IOT device 125n is a vehicle that includes a sensor that detects the health of the tires of the vehicle. The invention is not limited to the two examples of IOT devices shown in FIG. 4, and any desired type of IOT devices and number of IOT devices may be used in implementations of the invention.

In embodiments, each IOT broker 130a-n may be an IOT message broker that functions as a publish/subscribe broker service that enables the sending and receiving of messages to and from IOT devices. For example, an IOT message broker may maintain a list of all client sessions and the subscriptions for each session. The IOT message broker, upon receiving a message published from an IOT device, checks for sessions with subscriptions that map to the topic of the published message. The IOT message broker then forwards the published message to all sessions that have a currently connected client.

IOT devices and IOT brokers are specialized devices and, thus, are particular machines. As such, implementations of the invention involve applying the inventive method with, or by use of, a particular machine. Aspects of the invention also provide improvements in the field of messaging, for example by providing an ordered set of actions that improve email messaging by automatically assigning priorities to incoming messages based on health data from IOT devices.

Each IOT broker 130a-n may be a respective computer device, such as a server, that communicates with its corresponding IOT device 125a-n via the network 120. In embodiments, each IOT device 125a-n publishes device status messages to its corresponding IOT broker 130a-n. For example, the IOT device 125a publishes device status messages about its water filter to the IOT broker 130a, and the IOT device 125n publishes device status messages about its tires to the IOT broker 130n.

The device status messages may include health data about the transmitting device, and the health data may be in any desired form. In an exemplary embodiment, the health data indicates the type of the device being monitored and one of three states for the device being monitored: green for healthy, yellow for about to fail, and red for failed. For example, the device status messages published by the IOT device 125a may include health data that indicates the device being monitored is a refrigerator:water_filter and that the current health of the refrigerator:water_filter is one of green (healthy), yellow (about to fail), and red (failed). The determination of whether the health of an IOT device is green, yellow, or red may be performed by comparing detected value(s) to threshold values. Aspects of the invention are not limited to health data in the form of green, yellow, and red, and instead any suitable measure of health data may be used with implementations of the invention. Other data may additionally be included in the device status messages that are published by each of the IOT devices 125a-n.

With continued reference to FIG. 4, according to aspects of the invention a message prioritization system 140 receives messages from the message server 105 and automatically and dynamically prioritizes the messages based on data received from one of the IOT devices 125a-n via one of the IOT brokers 130a-n. The message prioritization system 140 comprises a computer system that may include one or more elements of the computer system/server 12 of FIG. 1. The message prioritization system 140 communicates with the message server 105, the IOT brokers 130a-n, and the user device 110 via the network 120.

In accordance with aspects of the invention, the message prioritization system 140 includes an IOT subscriber module 141, an IOT device status database 142, a prioritization rules database 143, a message content analyzer and classifier 144, and a prioritization engine 145, each of which may comprise one or more program modules such as program modules 42 of FIG. 1. In embodiments, the modules of the message prioritization system 140 collectively provide the dynamic message prioritization 96 described with respect to FIG. 2. Aspects of the invention are not limited to the exact number of modules shown in FIG. 4, and fewer modules may be used by combining the functionality of one or more modules into another module. Conversely, more modules may be employed by splitting the functionality of one or more of the modules shown into plural different modules.

According to aspects of the invention, the IOT subscriber module 141 is configured (e.g., programmed) to subscribe to and receive device status messages from the IOT brokers 130a-n. In embodiments, the user device 110 communicates with the message prioritization system 140 to provide the user's credentials to the IOT subscriber module 141. In doing so, the user authorizes the IOT subscriber module 141 to utilize the user credentials to subscribe to the IOT brokers 130a-n. For example, the user may possess user credentials (e.g., username, password, etc.) associated with their IOT device 125a, and may use the user device 110 to provide these credentials to the IOT subscriber module 141. The IOT subscriber module 141 utilizes the user credentials for IOT device 125a to subscribe to messages from the IOT broker 130a. In this manner, when the IOT device 125a publishes a device status message to the IOT broker 130a, the IOT broker 130a transmits the published device status message to the IOT subscriber module 141 based on the subscription and the user credentials. The user may provide respective credentials for each IOT device 125a-n to the IOT subscriber module 141, such that the IOT subscriber module 141 can subscribe to plural IOT brokers 130a-n for a single user.

The IOT subscriber module 141 may communicate with the each respective IOT broker 130a-n using a respective application program interface (API) that is unique to each respective IOT broker 130a-n. For example, the IOT subscriber module 141 may use a first device manufacturer API to subscribe to the IOT broker 130a, and may use a second device manufacturer API (different than the first API) to subscribe to the IOT broker 130n.

According to aspects of the invention, the IOT subscriber module 141 is configured to categorize and persist the received device status messages to the IOT device status database 142 for further use. The categorizing may include parsing and normalizing. The IOT subscriber module 141 may use any suitable logic (e.g., text analysis, etc.) for parsing and normalizing the data of a device status message received from one of the IOT brokers 130a-n. In embodiments, the IOT device status database 142 stores categorization information with a schema such as: a device category (such as "automobiles"), a name (such as "my car"), a device part name/ID (such as "left front tire") and a device part health status (such as "yellow" where "yellow" indicates that part is about to fail). For example, based on a device status message published by the IOT device 125n and received from the IOT broker 130n, the IOT subscriber module 141 may populate a row in the IOT device status database 142, wherein the row includes the data: category=automobile; device=car; part=left front tire; and health status=yellow. In another example, based on a device status message published by the IOT device 125a and received from the IOT broker 130a, the IOT subscriber module 141 may populate a row in the IOT device status database 142, wherein the row includes the data: category=appliance; device=refrigerator; part=water filter; and health status=red. Aspects of the invention are not limited to this schema, and other schema may be used.

According to aspects of the invention, the prioritization rules database 143 is configured (e.g., programmed) to store rules that dictate how message priority is set based on IOT device status. The rules stored in the prioritization rules database 143 may be defined by various external sources, including but not limited to at least one of: a device manufacturer (e.g., a manufacturer of one of the IOT devices 125a-n); a service vendor; or the user device 110. An exemplary rule that may be stored in the prioritization rules database 143 is given by the expression: "If the car part=="tire" with status=="yellow", then priority of incoming messages under the classification ("automobile parts" and "advertisement")=="High" otherwise=="Spam". Aspects of the invention are not limited to this type of rule, and other types of rules may be used. In embodiments, the user may use the user device 110 to communicate with the message prioritization system 140 to configure one or more rules stored in the prioritization rules database 143. In this manner, the user may customize the system based on their preferences.

According to aspects of the invention, the message content analyzer and classifier 144 is configured (e.g., programmed) to determine a classification of an incoming message received from the message server 105. In embodiments, the message content analyzer and classifier 144 performs Natural Language Processing (NLP) on the text of the message (e.g., the incoming email received from the message server 105) to determine its classification. For example, a message containing an advertisement for car tires could be classified under tags such as "Automobile parts", "Advertising", and "Sales offer". The message content analyzer and classifier 144 may be programmed with any one or more techniques that are available to perform this analysis, including but not limited to natural language understanding services and text mining models developed within an SPSS (statistical package for the social sciences) product or other similar software tools and libraries.

According to aspects of the invention, the prioritization engine 145 is configured (e.g., programmed) to iterate through device statuses in the IOT device status database 142 and select devices whose health status requires user attention. In embodiments, the prioritization engine 145 compares categories of selected devices (from the data of the IOT device status database 142) against categories of the received message (from the data of the message content analyzer and classifier 144) and when there is a match, the prioritization engine 145 uses the prioritization rules database 143 to assign the appropriate priority to the message (i.e., the email message).

In an exemplary use case described with respect to FIG. 4, the prioritization rules database 143 stores a rule according to the expression: "If the car part=="tire" with status=="yellow", then priority of incoming messages under the classification ("automobile parts" and "advertisement") =="High" otherwise=="Spam". At time t1, the IOT device 125n (e.g., the user's car) publishes a device status message indicating that the left front tire of the car has a health of "yellow". The IOT broker 130n transmits the device status message to the IOT subscriber module 141 (based on the IOT subscriber module 141 having subscribed to the IOT broker 130n using the user credentials for the IOT device 125n). The IOT subscriber module 141 categorizes (e.g., parses and normalizes) the device status message and populates a row of the IOT device status database 142 with the data: category=automobile; device=car; part=left front tire; and health status=yellow.

Still referring to the exemplary use case, at time t2 after time t1, the message sender 115 sends a message (e.g., an email message) to the user device 110. The email message is an advertisement for a sale on car tires and is sent with a normal priority. The message server 105 sends the email message to the message content analyzer and classifier 144, which analyzes and classifies the email message with tags such as "Automobile parts", "Advertising", and "Sales offer". The message content analyzer and classifier 144 passes the email message and the classification (e.g., the tags) to the prioritization engine 145, which compares the classification (e.g., the tags) to categories of devices saved in rows of the IOT device status database 142. Based on the comparing, the prioritization engine 145 determines there is a match between the message classification "Automobile parts" and the IOT device status database 142 entry: category=automobile; device=car; part=left front tire; and health status=yellow. Based on determining the match, the prioritization engine 145 accesses the prioritization rules database 143 and applies the following rule to the email message: "If the car part=="tire" with status=="yellow", then priority of incoming messages under the classification ("automobile parts" and "advertisement")=="High" otherwise=="Spam". Based on the applied rule, the prioritization engine 145 changes the priority of the email message from normal to high.

Still referring to the exemplary use case, the prioritization engine 145 communicates the determined priority to the message server 105, which communicates the determined priority to the user device 110. Based on receiving the determined priority from the message server 105, the user device 110 displays the priority with the email message in the messaging application program interface on the user device 110. For example, the email message from the message sender 115 is displayed in the user's email inbox (on the user device 110) with a high priority based on health data received from the IOT device 125*n* that neither the message sender nor the message recipient is aware of.

Still referring to the exemplary use case, in an alternative situation in which the device status message published by the IOT device 125*n* (e.g., the user's car) indicates that all tires of the car have a health of "green", then the prioritization engine 145 would dynamically assign the priority of "Spam" to the same email message based on applying the rule: "If the car part=="tire" with status=="yellow", then priority of incoming messages under the classification ("automobile parts" and "advertisement")=="High" otherwise=="Spam". In this situation, the same email message from the message sender 115 would be displayed in the user's email interface (on the user device 110) with a Spam priority. In this manner, it is seen how the message prioritization system 140 may dynamically assign a priority to an incoming message based on data received from the IOT device 125*n*, and a same email message from a same message sender may be assigned a different priority at different times based on different data having been published by the IOT device 125*n*.

Still referring to FIG. 4, in embodiments the message prioritization system 140 is configured to dynamically change a priority of an email message based on IOT device data that is received after the email message is received. For example, as described herein, an incoming email message for an advertisement may initially be assigned a spam priority, and displayed in a spam folder of the user's email interface (on the user device 110). Subsequently, the IOT device may publish a device status message indicating a yellow or red health of the device. The IOT subscriber module 141 may categorize (e.g., parse and normalize) the device status message and save the results in the IOT device status database 142. The prioritization engine 145 may determine a match between the categorization of the device status message and the classification of the email message that is currently in the user's spam folder. Based on the determined match, the prioritization engine 145 may access the prioritization rules database 143 and apply a rule to change the priority of the email message, e.g., from spam to high priority. Based on changing the prioritization of the email message, the message server 105 may automatically move the email message from the user's spam folder to the user's inbox in the email interface displayed on the user device 110. Moreover, most email systems handle message routing (e.g., to folders), message archiving, spam filtering, etc., using rules that are either preconfigured by the user or are learned by the email system based on observing user actions. Accordingly, this aspect of the invention may cause a rule to be undone (e.g., a rule that would normally move the message to a spam folder instead restores the message from the spam folder) or may cause an alternate rule to be applied (e.g., apply the 'move to high priority folder rule instead of the 'move to coupons folder').

In this manner, aspects of the invention provide a method for dynamically setting message priorities for a user's mail system based on the health status of the user's IOT devices. The method includes: receiving a message at the user's mail system; performing natural language processing (NLP) on the received message; determining based on the NLP that the message is an advertisement related to a particular type of device (e.g., repair of a car, a new dishwasher); assigning, based on the determination, a low priority to the message; placing, based on the low priority, the message into the user's spam folder; receiving a notification from one of the user's IOT devices indicating that the health of the device is declining, wherein the device is of the same type as the advertisement; reassigning, based on the notification, the message with a high priority; and moving, based on the high priority, the message from the user's spam folder to the user's inbox.

In an embodiment, the network 120 comprises, or is part of, a cloud computing environment such as cloud computing environment 50 of FIG. 2. In this embodiment, each of the message server 105, the user device 110, the message sender 115, the IOT devices 125*a-n*, the IOT brokers 130*a-n*, and the message prioritization system 140 comprises a respective cloud computing node such as cloud computing nodes 10 of FIG. 2.

In embodiments, the message prioritization system 140 may be separate from the message server 105. In other embodiments, the message prioritization system 140 may be part of the message server 105, as diagrammatically indicated by link 150, such that an owner of the message server 105 performs the functions of both the message server 105 and the message prioritization system 140 as described herein.

Figure 5:
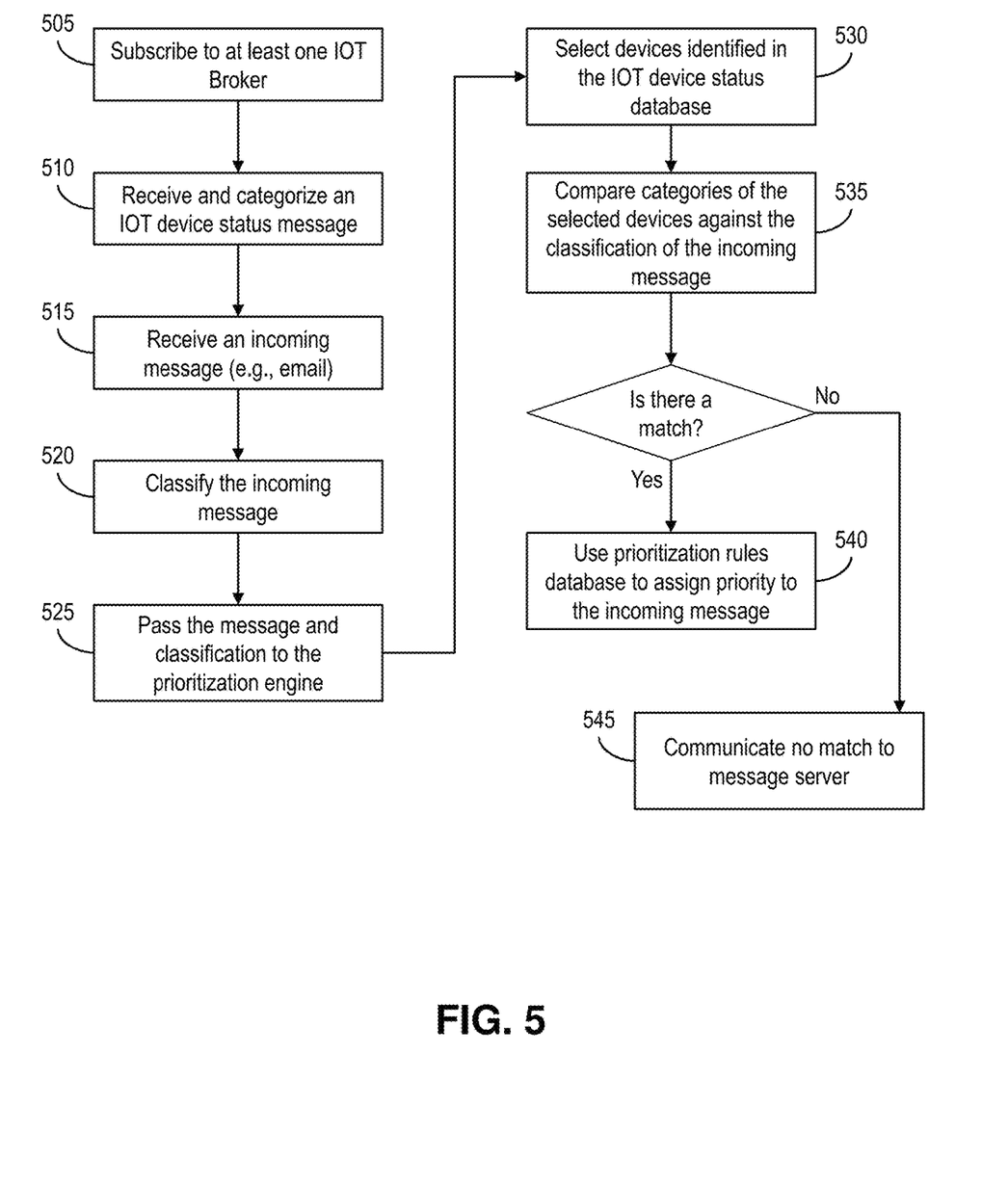
FIG. 5 shows a flowchart of a method in accordance with aspects of the invention.

FIG. 5 shows an example flowchart of a process for enabling an offline mode for a user device. The steps of FIG. 5 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

At step 505, a system subscribes to at least one IOT broker. In embodiments, as described with respect to FIG. 4, the IOT subscriber module 141 receives user credentials for IOT device 125*a* from the user device 110 and provides the user credentials to the IOT broker 130*a*.

At step 510, the system receives a device status message based on the subscription of step 505. In embodiments, as described with respect to FIG. 4, the IOT device 125*a* publishes a device status message to the IOT broker 130*a*. The IOT broker 130*a* passes the device status message to the IOT subscriber module 141 based on the subscription from step 505. Step 510 may include the IOT subscriber module 141 categorizing (e.g., parsing and normalizing) and persisting the device status message to the IOT device status database 142 for further use, e.g., as described with respect to FIG. 4.

At step 515, the message content analyzer and classifier 144 receives an incoming message. For example, as described with respect to FIG. 4, the message server 105 may receive a message (e.g., an email message) from the message sender 115, and the message server 105 may transmit the email message to the message content analyzer and classifier 144.

At step 520, the message content analyzer and classifier 144 classifies the message received at step 515. In embodiments, as described with respect to FIG. 4, the message content analyzer and classifier 144 performs text-mining on the email using NLP techniques.

At step 525, the message content analyzer and classifier 144 passes the message and the classification to the prioritization engine 145. Step 525 may be performed in the manner described in FIG. 4.

At step 530, the prioritization engine 145 selects devices identified in the IOT device status database 142. In embodiments, as described with respect to FIG. 4, the prioritization engine 145 analyzes the data stored in the IOT device status database 142 and selects devices whose health status requires attention (e.g., devices with data indicating a yellow or red health).

At step 535, the prioritization engine 145 compares categories of the selected devices (from step 530) against the classification of the incoming message (from step 525). In embodiments, as described with respect to FIG. 4, the prioritization engine 145 compares the tags applied to the email message (from the classification of the message content analyzer and classifier 144) to the categories of selected devices (from the data of the IOT device status database 142).

In the event there is a match at step 535, then at step 540 the prioritization engine uses the prioritization rules database 143 to determine and assign the appropriate priority to the message. In embodiments, as described with respect to FIG. 4, the prioritization engine 145 accesses the prioritization rules database 143, selects a rule in the prioritization rules database 143 based on the tags applied to the email message and/or the categories of selected devices, and applies the selected rule to the message. Based on applying the selected rule, the prioritization engine 145 dynamically adjusts the priority of the message. Step 540 may also include the prioritization engine 145 passing the assigned priority to the message server 105, so that the message server 105 can pass the assigned priority to the user device 110 for displaying the priority (determined by the prioritization engine 145) in the messaging application program interface with the message.

In the event there is not a match at step 535, then at step 545 the prioritization engine communicates to the message server 105 that there is no dynamically determined priority for the message. In this situation, the message server 105 may apply other rules (e.g., default rules) to determine a priority of the message, and may pass the determined priority to the user device 110 for displaying the priority (determined by the message server 105) in the messaging application program interface with the message.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for dynamically prioritizing messages, the computer program product comprising a computer readable storage medium having program instructions embodied therewith, the program instructions executable by a computing device to cause the computing device to:

receive user credentials associated with an Internet-of-Things (JOT) device;
subscribe to an JOT broker using the user credentials;
receive a device status message from the IOT broker based on the subscribing, wherein the device status message includes health data of the IOT device;
determine a categorization of the device status message;
receive an email message from a message server;
determine a classification of the email message;
compare the categorization of the device status message to the classification of the email message;
assign a priority to the email message based on the comparing; and
transmit the assigned priority to the message server;
wherein the assigning the priority comprises changing the priority from a first priority to a second priority in response to an indication in the health data included in the device status message that health of the IOT device has fallen below a predetermined threshold.

2. The computer program product of claim 1, wherein the subscribing to the IOT broker is performed using an application program interface (API) of the IOT broker.

3. The computer program product of claim 1, wherein the assigning the priority to the email message comprises:
accessing a prioritization rules database;
selecting a rule stored in the prioritization rules database based on the categorization of the device status message and the classification of the email message; and
applying the selected rule to the email message.

4. The computer program product of claim 1, wherein the email message is an incoming message and the priority is assigned prior to the email message being displayed in an email application program interface of a user device.

5. The computer program product of claim 1, wherein the health of the IOT device is categorized as one of healthy, about to fail, and failed, based on comparing the health with predetermined threshold values.

6. The computer program product of claim 1, wherein the changing the priority from a first priority to a second priority causes the email message to be moved from a first folder to a second folder in an email application program interface of a user device.

7. The computer program product of claim 6, wherein the first folder is a SPAM folder and the second folder is a user's inbox.

8. A system comprising:
a CPU, a computer readable memory, and a computer readable storage medium;
program instructions to receive a device status message from an Internet-of-Things (JOT) device, wherein the device status message includes health data of the IOT device;
program instructions to determine a categorization of the device status message;
program instructions to determine a classification of an email message;
program instructions to compare the categorization of the device status message to the classification of the email message; and
program instructions to assign a priority to the email message based on the comparing,
wherein the program instructions are stored on the computer readable storage medium for execution by the CPU via the computer readable memory,
wherein the assigning the priority comprises changing the priority from a first priority to a second priority in response to an indication in the health data included in the device status message that health of the IOT device has fallen below a predetermined threshold.

9. The system of claim 8, wherein the changing the priority from a first priority to a second priority causes the email message to be moved from a first folder to a second folder in an email application program interface of a user device.

10. The system of claim 9, wherein the first folder is a SPAM folder and the second folder is a user's inbox.

11. The system of claim 8, further comprising program instructions to:
receive user credentials associated with the IOT device; and
subscribe to an IOT broker using the user credentials.

12. The system of claim 11, wherein the device status message is received from the IOT broker based on the subscribing.

13. The system of claim 8, wherein the determining the classification of the email message comprises performing natural language processing on text of the email message.

14. The system of claim 8, wherein the priority is assigned prior to the email message being displayed in an email application program interface of a user device.

15. The system of claim 8, further comprising:
program instructions to receive a message from a message server; and
program instructions to communicate the assigned priority of the message to the message server.

16. The system of claim 15, wherein the communicating the assigned priority causes undoing a rule that was previously applied to the email message.

17. The system of claim 15, wherein the communicating the assigned priority causes applying an alternative rule to the email message.

18. The system of claim 8, wherein the assigning the priority to the email message comprises accessing a rules database based on determining a match between the classification of the email message and the categorization of the device status message.

19. The system of claim 8, wherein the health of the IOT device is categorized as one of healthy, about to fail, and failed, based on comparing the health with predetermined threshold values.

20. The system of claim 8, further comprising:
program instructions to receive a message from a message server; and
program instructions to communicate the assigned priority of the message to the message server,
wherein:
the changing the priority from a first priority to a second priority causes the email message to be moved from a first folder to a second folder in an email application program interface of a user device;
the priority is assigned prior to the email message being displayed in an email application program interface of a user device;
the communicating the assigned priority causes undoing a rule that was previously applied to the email message;
the assigning the priority to the email message comprises accessing a rules database based on determining a match between the classification of the email message and the categorization of the device status message;
the health of the IOT device is categorized as one of healthy, about to fail, and failed, based on comparing the health with predetermined threshold values; and
the first folder is a SPAM folder and the second folder is a user's inbox.

* * * * *